United States Patent [19]
Goossen et al.

[11] Patent Number: 5,170,455
[45] Date of Patent: Dec. 8, 1992

[54] OPTICAL CONNECTIVE DEVICE

[75] Inventors: Keith W. Goossen, Aberdeen; James A. Walker, Howell, both of N.J.

[73] Assignee: AT&T Bell Laboratories, Murray Hill, N.J.

[21] Appl. No.: 785,352

[22] Filed: Oct. 30, 1991

[51] Int. Cl.⁵ .............................................. G02B 6/24
[52] U.S. Cl. .................................... 385/89; 385/146; 385/147; 385/50
[58] Field of Search ................... 385/89, 146, 147, 50, 385/88, 126; 359/622, 641, 599

[56] References Cited

U.S. PATENT DOCUMENTS

| | | | |
|---|---|---|---|
| 3,421,805 | 1/1965 | Rowland | 359/622 |
| 4,874,499 | 10/1989 | Smith et al. | 204/403 |
| 5,093,879 | 3/1992 | Bregman et al. | 385/89 |
| 5,093,890 | 3/1992 | Bregman et al. | 385/146 |

OTHER PUBLICATIONS

"Photochemically Machined, Glass Ceramic, Optical Fiber Interconnection Components" J. L. Plawsky, et al., SPIE vol. 994 Optoelectronic Materials, Devices, Packaging, and Interconnects pp. 101–106 (1988).

Primary Examiner—John D. Lee
Assistant Examiner—S. W. Barns
Attorney, Agent, or Firm—E. Weiss

[57] ABSTRACT

This invention is an optical connective device which can have a two-dimensional array of optical fibers. The device can be comprised of a single piece of light conducting material such as glass, plastic or the like shaped to have a slab support member having pillars which project outward from opposing surfaces. The pillars on one of the opposing surfaces are optically aligned with corresponding pillars on the other opposing surface. The length of a pillar can be as small as its diameter. The ends of the pillars can be flat or curved to form a lens and each pillar can be accurately located to an arbitary position. The optical connective device can be sandwiched between chips to provide an integrated circuit chip-to-chip connective device for a stack of two or more chips.

13 Claims, 4 Drawing Sheets

OPTICAL CONNECTIVE DEVICE

TECHNICAL FIELD

This invention relates generally to an optical connective device, and more particularly, to a monolithic array of optical fibers.

BACKGROUND OF THE INVENTION

Currently, optical fibers are used in optical backplanes for computers where the distances being traversed is only tens of centimeters. The use of optical fibers allows for higher bandwidth operation because skin effect losses associated with metal conductors is avoided. Thus, it is becoming attractive to develop equipment such as computers and the like in which direct chip-to-chip or board-to-board connections via light is used. In addition to the high speed, low attenuation and higher bandwidth possible per channel with an optical connective device, interference due to electromagnetic energy is eliminated.

Two current optical connective devices which have been developed are identified in publications as the Columbia University design and the Honeywell design. In the Columbia University design a single mode optical fiber is coupled to a buried detector via a carefully machined aluminum guide coupled to a side of a chip. In the Honeywell design, an array of optical fibers are arranged along a single plane and held in alignment via a chemically machined silicon V-groove fixture. The ends of the optical fibers are positioned over detectors in a chip, the ends being beveled to direct light from the optical fibers to the detectors.

The cores of optical fibers are very fine, their core diameter being less than 15 microns. Obviously, therefore, the manufacture of current optical connective devices which requires positioning an end of an optical fiber into a slot or an opening to obtain alignment with a detector or an optical path on a chip or a board not only required great accuracy, but is usually difficult and painstaking.

Clearly, a need exists for an optical connect for chips and boards which is economical to construct, has dimensions which are dependably accurate, and which permits chips and boards to be more closely coupled to each other.

This invention is directed toward an optical connective device which meets these needs.

SUMMARY OF THE INVENTION

This invention is an optical connective device which can have a two-dimensional array of optical fibers. The device can be comprised of a single piece of light conducting material such as glass, plastic or the like shaped to have a slab support member having pillars which project outward from opposing surfaces. The pillars on one of the opposing surfaces are optically aligned with corresponding pillars on the other opposing surface. The length of a pillar can be as small as its diameter. The ends of the pillars can be flat or curved to form a lens and each pillar can be accurately located to an arbitrary position. The optical connective device can be sandwiched between chips to provide an integrated circuit chip-to-chip connective device for a stack of two or more chips.

DETAILED DESCRIPTION

Figure 1:
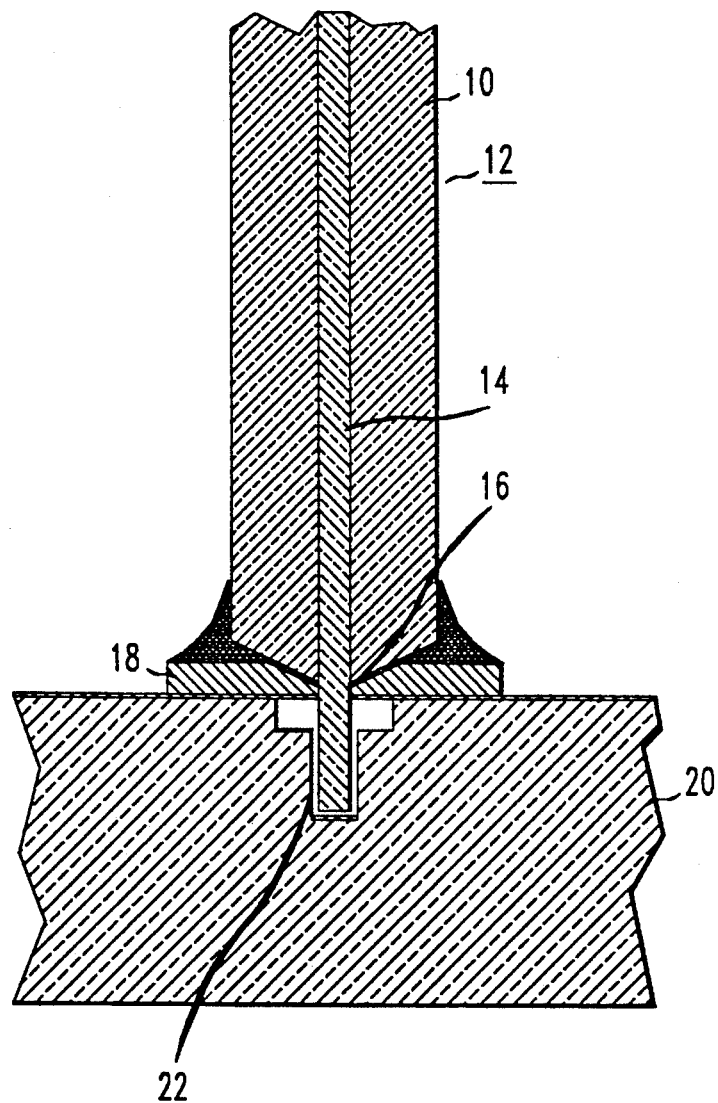
FIG. 1 is a schematic of a prior art single fiber connect usually identified as the Columbia University design.

The drawings are not necessarily to scale and certain parts of the drawing have been simplified to aid in clarity of exposition.

Referring to FIG. 1, there is illustrated the prior art Columbia University design. In this structure, the cladding 10 at the end of a single mode optical fiber 12 is removed to expose the core 14. The exposed core of the fiber is inserted through an opening 16 in a precision machined aluminum guide 18 which is coupled securely via epoxy cement or the like to a chip 20. The exposed end of the fiber projects into an opening 22 of the chip for coupling to, for example, a buried detector. The single mode optical fiber 12 is secured to the aluminum guide 18 with an adhesive such as epoxy cement.

Figure 2:
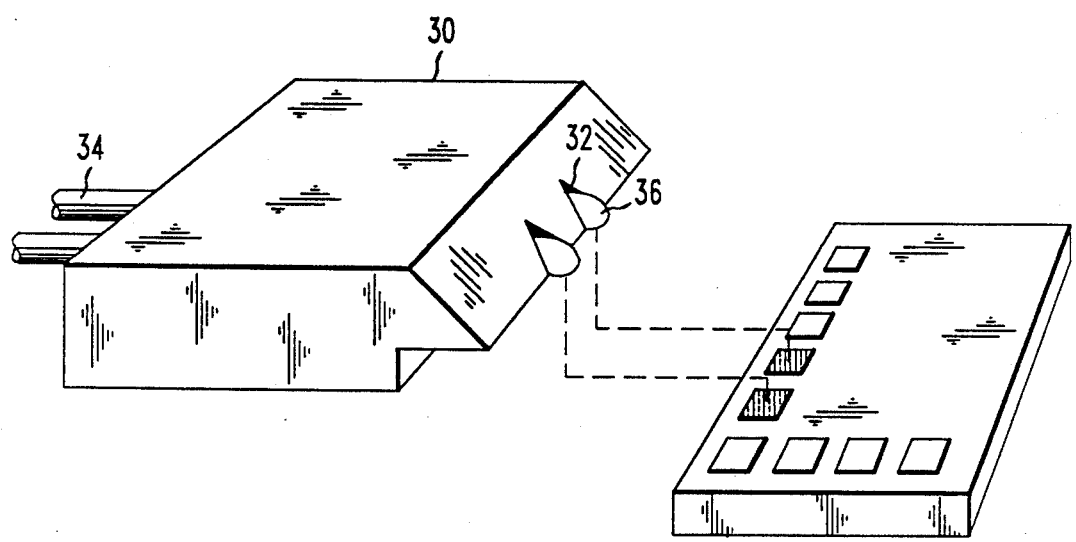
FIG. 2 is a schematic of a prior art single plane array optical fiber connect usually identified as the Honeywell design.

FIG. 2 illustrates the prior art Honeywell design. In this structure, an alignment fixture 30 contains a plurality of chemically machined grooves 32, each being adapted to receive and hold an optical fiber 34. The ends 36 of the optical fibers are held captive by the grooves which are beveled to permit light in the core of a fiber to be reflected out at a desired angle. Obviously, if the bevel has an angle of 45°, the light will leave the fiber at an angle of 90° to the axis of the core. The Honeywell design can be used to couple an array of optical fibers aligned in a single plane to integrated detectors 38 located along a perimeter of a chip or a board.

Manufacture and assembly of each of the prior art optical fiber connects requires a highly skilled worker. They are expensive to construct, and are not practical for chip-to-chip coupling where it is desirable to have the chips closely stacked.

Figure 3:
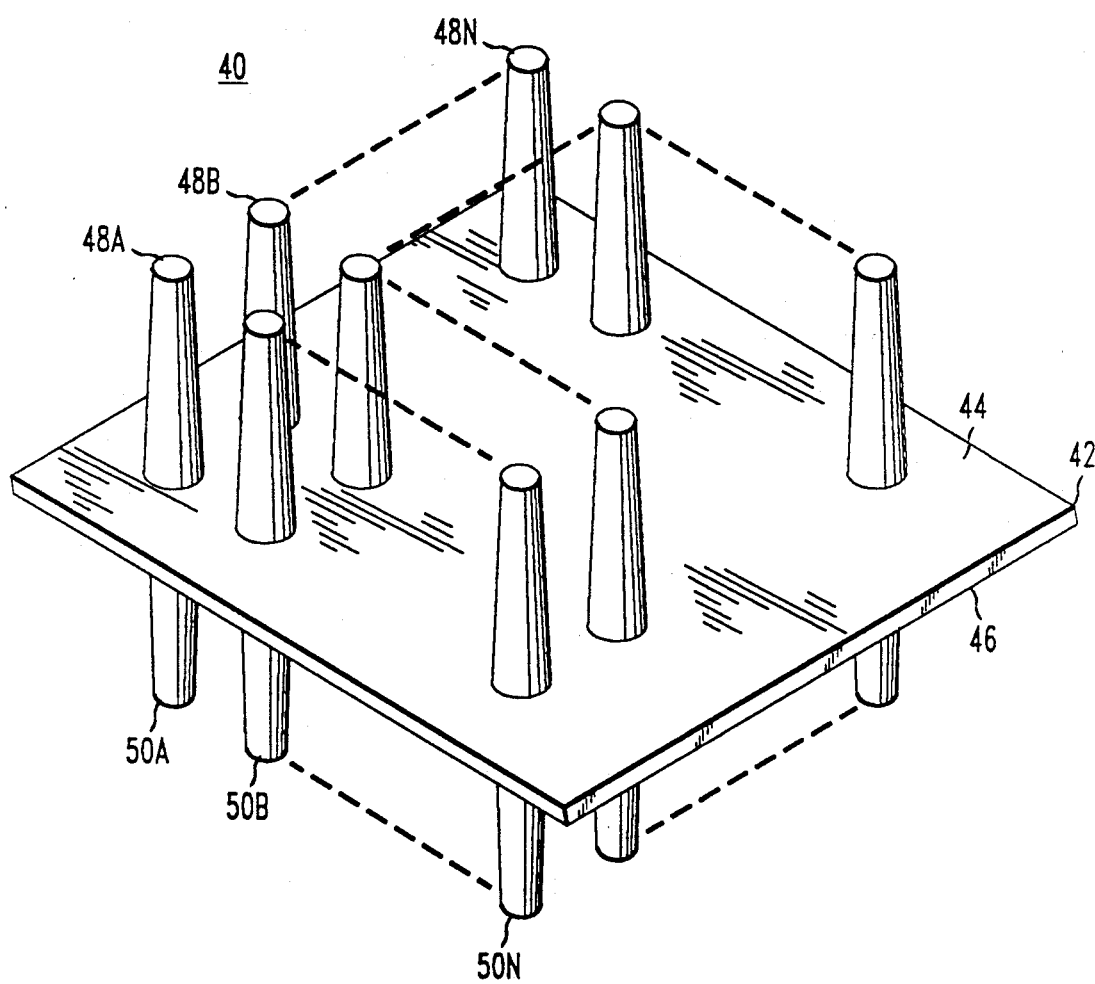
FIG. 3 is a schematic of structure in accordance with the principles of the invention of a two plane array optical fiber connect.

Referring to FIG. 3, there is illustrated structure 40 in accordance with the principles of this invention. In one embodiment of the invention, a support member 42 having opposing surfaces 44, 46 supports a first 48 and second 50 array of pillars. The first array of pillars consist of discrete pillars 48A, 48B, 48C . . . 48N; and the second array of pillars consist of discrete pillars 50A, 50B, 50C . . . 50N. The various pillars 48A . . . 48N which project outward from surface 44 are optically aligned with corresponding pillars 50A . . . 50N which project outward from opposing surface 52. Support member 42, pillars 48A . . . 48N and pillars 50A . . . N are monolithic, a structure of a common material which can transmit optical energy. Thus, optical energy received by any one pillar 48N which projects outward from surface 48 will be transmitted through that pillar 48N, through the portion of the support member 42 coupled to the end of the pillar 48N, and then through the pillar 50N optically aligned with the pillar 48N which received the optical energy. In this invention, the pillars operate as optical fibers where the lengths of each optical fiber is the length of pillar 48N plus the length of pillar 50N plus the thickness of the support member 42.

In the embodiment of FIG. 3, the pillars can be formed by micromachining, using either a laser, ion milling, chemical etching, injection molding or the like. The term "micromachined" as used herein with respect to an array of pillars which project outward from opposing surfaces of a support member, is to be construed to mean a structure which is configured using any process which can produce the inventive structure with a high degree of dimensional and geometric accuracy. Materials which can be utilized to form the structure by etching includes, but is not limited to Fotoform TM glass (obtained from Corning Glass).

Fotoform material is photopatternable via exposure to UV light and subsequent chemical etching. Pillars having lengths of six hundred microns, diameters of less than forty microns and spacing of less than fifty microns can be achieved using this material. The processed glass is transparent and transmits optical energy.

More specifically, Fotoform material can be processed to form the inventive device by, first, exposing either one or both surfaces of a plate of Fotoform to ultraviolet (UV) light through a high precision mask. The mask forms a desired pattern of UV light on a ground and polished surface of a plate of Fotoform glass. The exposed plate is heat treated to develop the pattern. The areas of the glass that was exposed to the UV light becomes a semi-crystalline, glass-ceramic material that is 30 to 50 times more soluble in a dilute hydrofluoric acid solution than the nonexposed parts of the glass. This solubility differences enables the exposed pattern to be differentially etched.

More specifically, Fotoform has the property that when exposed to ultraviolet light (UV), silver atoms form crystallization centers in the exposed regions, which during a subsequent heat treatment allow nucleation and growth of lithium metasilicate crystals. Once this heat treatment is completed, the regions which were exposed to UV are 30–40 times more soluble in dilute hydrofluoric acid than unexposed regions. An optical connective device was formed by exposing a plate 1.6 mm thick to plane-wave UV normally incident through a standard photolithographic mask with small opaque disks. Upon heating to 600° C., the regions exposed to UV crystallize. The plate is then exposed to agitated HF causing fast etching of the crystallized regions from both faces leaving pillars. Slight etching of the non-UV-exposed regions occurs causing the pillars to have a 3° taper. Therefore, the base of the pillars have the same diameter as the mask disk ($d_m$), and the tip of the fiber has a diameter given by $d_t = d_m - 0.105 \times 1$, where 1 is the pillar length. The etch was timed so as to leave a 170 μm thick supporting member. Thus, the pillars were each approximately 700 μm long. The resulting pillar tips were roughened by the etch, so mechanical polishing was performed. During polishing, the fibers were supported by wax that was melted and flowed between the fibers and allowed to cool. The entire fabrication process was performed with negligible variations across a 4×4 inch plate. If desired the end of the pillars can be shaped to have a lens rather than being flat. One method of producing a lens is to heat the ends of the pillars until the material starts to melt and form a convex shaped lens.

Pillars whose tips have a diameter of nominally 40, 60, 80 and 100 μm and arrays with center-to-center spacings of 400 and 1000 μm have been fabricated.

The inventive connect device can also be formed by using Lexan TM OQ-1020 from General Electric. This method is an optically transmitting plastic which, in combination with the injection molding process, forms a one-piece molded device. During the molding process, care should be exercised to insure that all bubbles have been eliminated from the finished product.

After the pillars have been formed on the support number, a wax-like material can be melted and poured onto each surface and allowed to solidify. This wax-like material provides mechanical support to the various pillars so that they will resist flexing or bending. Thereafter, the ends of the optical fibers are ground to a final dimension and polished. If desired, the wax-like material may remain after the grinding and polishing operation provided it has an index of refraction which is less than that of pillar material. If desired the ends of the optical fibers can be shaped to form a convex lens by either heating or shaping during the molding process. If the lens is formed during the molding process, it can be either concave or convex.

Figure 4:
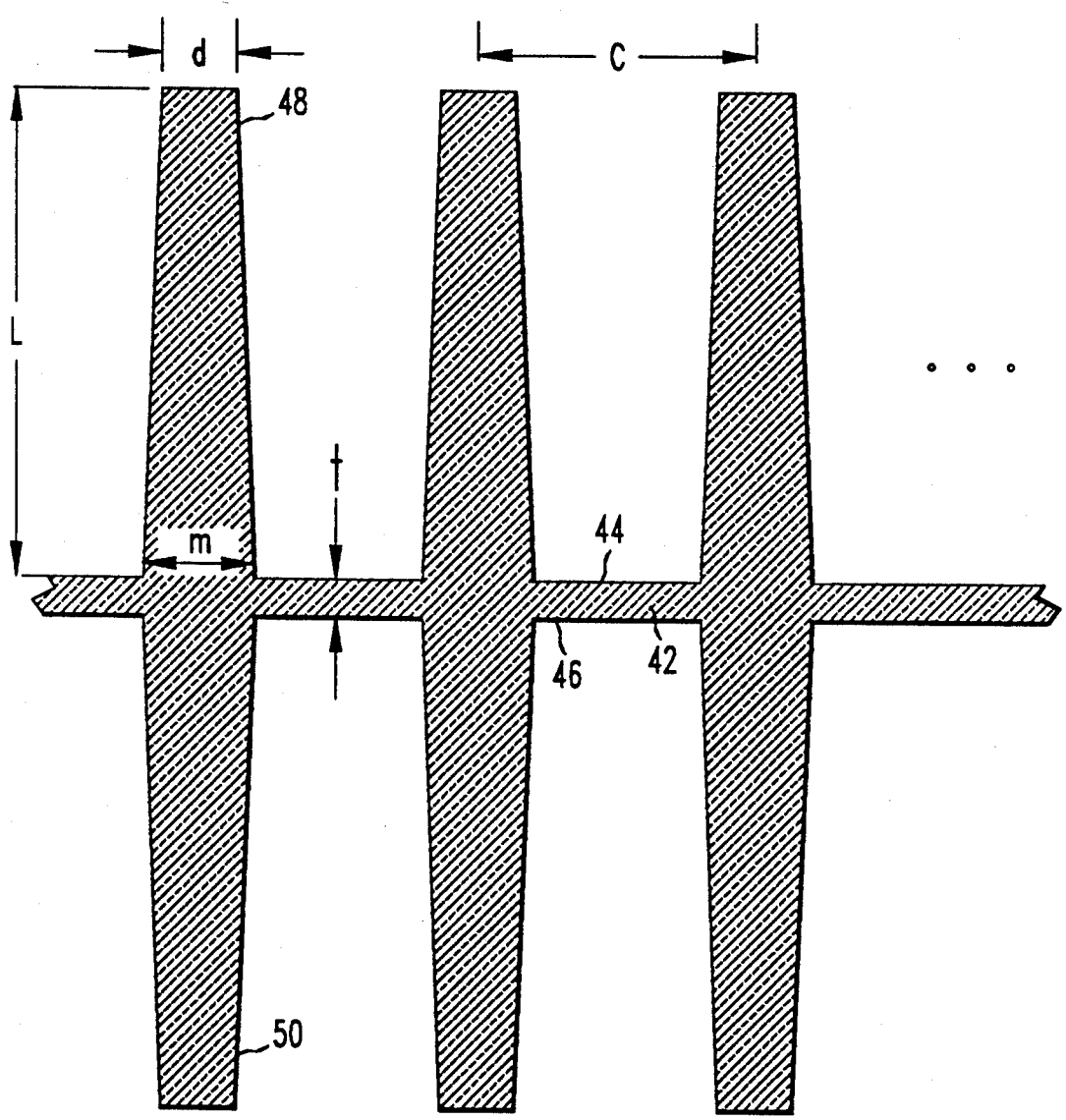
FIG. 4 is an enlarged view of a section of the structure of FIG. 3.

Referring to FIG. 4, there is illustrated an enlarged cross section view through a row of pillars 48N, 50N and support member 42 of FIG. 3 when formed with Fotoform material. During the etching process, the acid solution first removes the material from the very ends of the fibers being formed. Thus, the acid solution is in contact with the ends of the fibers for a larger period of time then it is in contact with the base of the fibers coupled to the support member 42. As a result, the optical fibers become slightly tapered as illustrated in FIG. 4. In one embodiment, the dimension C, which is the center-to-center spacing of the optical fibers is 400 microns; the dimension d, which is the final face diameter of the optical fiber is 40 microns; the dimension m, which is the mask feature diameter is 100 microns; the dimension L, which is the stub length of the optical fiber length is 600 microns; and, the dimension t, which is the thickness of the support member, is 250 microns.

If it is assumed that, with Fotoform material, an area of 10 microns is needed for exposure to the UV light, then the closest center-to-center spacing of the optical fibers which can be obtained is $d + 2L \tan(3°) + 10$ microns which, for our device, is roughly 112 microns. The dimension of 3° in the relationship is the taper angle of the pillar.

In still another embodiment of the invention, where the pillars are formed using Fotoform, a layer of etch resistance glass is positioned between two layers of Fotoform. The etch resistant glass can have a thickness of 250 microns and each sheet of Fotoform can have a thickness of 600 microns. Thermal bonding or an adhesive of epoxy or the like can be used to attach the two sheets of Fotoform to the etch resistant glass. The sandwich assemblage is then exposed to UV light, heat treated and etched to form the inventive structure. As noted above, structural support material such as wax or the like can be poured into the spaces between the optical fibers and allowed to harden to prevent the various optical fibers from bending or flexing during subsequent grinding and polishing steps.

The inventive device disclosed is a simple to construct, zero-assembly, two dimensional optical fiber array connect device. In one embodiment, it is a single piece of glass or plastic in which multimode optical fiber pillars have been either etched from both faces or formed with injection molding. The position of the pillars and, thus, the fibers, are defined by lithographic techniques or the like thus allowing the device to be aligned with integrated circuit chips.

The inventive optical connective device here disclosed makes possible information access from the entire area of a chip, rather than just the perimeter, as light can flow vertically from the surface, and it does this with a connect device which is free of assemblage problems.

The full utilization of optical inter-chip communication entails two-dimensional arrays of light beams. Prior to this invention, the construction of large two dimensional arrays of optical fiber connect devices required a painstaking and costly assemblage. Therefore, prior to this invention, efforts were focussed on freespace optical techniques which required complicated optical designs.

With this invention, an optical fiber interconnect device can be made which has optical fibers in two dimensions, not just one, and they are at the exact location needed for optical interconnection to a chip. Clearly, with this inventive connect device, connections to a chip or a board are not restricted to an end or edge, but can be along a side of a chip or board i.e., its major surface. Thus, chips or boards can now be stacked one on top of another, the inventive connect device being interposed between adjacent chip or boards to provide the necessary connections between the various chips or boards of a stack. The use of the invention devices between chips allows a cooling fluid to flow therebetween, if desired.

What has been described is merely illustrative of the application of the principles of the present invention. Other arrangements and methods can be implemented by those silled in the art without departing from the spirit and scope of the present invention.

We claim:

1. An optical connective device comprising
    a support member having first and second opposing surfaces,
    a first array of pillars supported by and projecting outward from said first surface, for receiving optical energy from a first chip,
    a second array of pillars supported by and projecting outward from said second surface, for directing optical energy to a second chip,
    the pillars of said first array of pillars being aligned with corresponding pillars of said second array of pillars,
    said pillars and said support member located between corresponding pillars being of a material which is transparent to energy at a frequency of interest.
2. The device of claim 1 wherein
    said first array of pillars and said second array of pillars are positioned in a single dimension.
3. The device of claim 1 wherein
    said first array of pillars and said second array of pillars are positioned in two dimensions.
4. The device of claim 1 wherein
    said first array of pillars, said second array of pillars and said support member are comprised of the same material.
5. The device of claim 1 wherein
    said first array of pillars and said second array of pillars are multimode optical fibers.
6. The device of claim 5 further
    comprising support material having an index of refraction lower than said pillar positioned between said first array of pillars.
7. The device of claim 5 wherein
    the pillars of said first array of pillars and the pillars of said second array of pillars have lengths which are greater than their diameters.
8. The device of claim 5 wherein the pillars of said first array of pillars have a tip diameter of at least 35 microns.
9. The device if claim 5 wherein the pillars of said first array of pillars have a tip diameter of at least 60 microns.
10. The device of claim 5 wherein said first array of pillars, said second array of pillars and said support member are of an etchable transparent material.
11. The device of claim 5 wherein said first array of pillars and said second array of pillars are of an etchable transparent material and
    said support member is of a nonetchable transparent material.
12. The device of claim 5 wherein the pillars of said first array of pillars have ends which are flat.
13. The device of claim 5 wherein the pillars of said first array of pillars have ends which are curved.

* * * * *